(12) United States Patent
Gentili

(10) Patent No.: US 10,433,475 B2
(45) Date of Patent: Oct. 8, 2019

(54) DUAL SEED METERING DEVICE

(71) Applicant: Jorge Alberto Gentili, Pcia. de Santa Fe (AR)

(72) Inventor: Jorge Alberto Gentili, Pcia. de Santa Fe (AR)

( * ) Notice: Subject to any disclaimer, the term of this patent is extended or adjusted under 35 U.S.C. 154(b) by 78 days.

(21) Appl. No.: 15/551,826

(22) PCT Filed: Jan. 23, 2017

(86) PCT No.: PCT/IB2017/050345
§ 371 (c)(1),
(2) Date: Aug. 17, 2017

(87) PCT Pub. No.: WO2017/130096
PCT Pub. Date: Aug. 3, 2017

(65) Prior Publication Data
US 2018/0249624 A1 Sep. 6, 2018

(30) Foreign Application Priority Data
Jan. 25, 2016 (AR) .............................. 20160100194

(51) Int. Cl.
| A01C 7/08 | (2006.01) |
| A01C 7/04 | (2006.01) |
| A01C 19/02 | (2006.01) |
| A01C 7/06 | (2006.01) |
| A01C 7/12 | (2006.01) |
| A01C 7/20 | (2006.01) |
| A01C 21/00 | (2006.01) |

(52) U.S. Cl.
CPC .............. *A01C 7/082* (2013.01); *A01C 7/046* (2013.01); *A01C 7/06* (2013.01); *A01C 7/123* (2013.01); *A01C 7/20* (2013.01); *A01C 19/02* (2013.01); *A01C 21/005* (2013.01)

(58) Field of Classification Search
CPC ........... A01C 7/082; A01C 7/081; A01C 7/08; A01C 7/00; A01C 7/046; A01C 7/044; A01C 7/042; A01C 7/04; A01C 7/06; A01C 7/123; A01C 7/12; A01C 7/20; A01C 19/02; A01C 19/00; A01C 21/005; A01C 21/00
See application file for complete search history.

(56) References Cited

U.S. PATENT DOCUMENTS

| 2005/0257725 A1 | 11/2005 | Landphair et al. |
| 2010/0282144 A1 | 11/2010 | Rans et al. |
| 2012/0048161 A1 | 3/2012 | Shoup |
| 2013/0175133 A1 | 7/2013 | Wagers |

(Continued)

*Primary Examiner* — Christopher J. Novosad
(74) *Attorney, Agent, or Firm* — Muncy, Geissler, Olds & Lowe, P.C.

(57) ABSTRACT

A dual seed metering device for seeds, grain or other granulate materials, powered by direct drive. More specifically, a dual seed metering device for sowing machines, driven by a single electric motor of the annular type, with a hollow shaft, which comprises two chambers or seed reservoirs, each being loaded with seeds of different types, the device being capable of selectively sowing seeds from one reservoir or the other, wherein selection of the type of seed is instantaneous and does not require stopping the equipment nor require manual mechanical adjustments.

20 Claims, 6 Drawing Sheets

(56) References Cited

U.S. PATENT DOCUMENTS

2014/0109810 A1\* 4/2014 Wilhelmi .............. A01C 19/02
  111/185
2015/0289441 A1 10/2015 Arnett et al.
2015/0334913 A1 11/2015 Gentili
2015/0351315 A1 12/2015 Wendte et al.

\* cited by examiner

DUAL SEED METERING DEVICE

FIELD OF THE INVENTION

The present invention refers to a dual or double direct drive metering device for seeds or other granular material. More specifically, the present invention relates to a metering device of seeds for a seed sowing machine, driven by a single electric motor of the annular or toroidal type, which comprises two chambers or seed reservoirs, each being loaded with seeds of different types.

BACKGROUND OF THE INVENTION

Crop sowing machines or seed planters for furrow sowing have been widely used during the past decades.

Usually, said machines comprise at least one rotating metering disc for retaining and administering the seeds to be planted, means to capture the seeds from a reservoir, and means to release the seeds in a controlled manner, guiding them towards furrows on the ground at a determined depth and spacing.

The rotating metering discs usually comprise orifices, holes, cradles or teeth which operate in conjunction with an air pressure difference, it being vacuum or positive pressure, for capturing and releasing the seeds. The pressure difference retains the seeds in said holes or cradles until the same is interrupted at a desired point, releasing the seeds which are then transported by conducting means towards furrows on the ground.

Commonly, sowing machines comprise a great number of sowing modules, each with its corresponding devices for opening furrows and one rotating metering disc for distributing granulates, such as seeds, into said furrows.

Traditionally, the sowing modules are driven by a single driving array which simultaneously rotates all the rotating metering discs within said modules. In cases of sowing machines with a great number of sowing modules, such as for example 20 or more, said driving array is bulky, complicated and expensive. Additionally, said driving array does not allow for individual adjustment of the rotation of each metering disk, which is necessary in those occasions in which the machine is not expected to follow a straight path and where in a curved path outer sowing modules in relation to the curve radius travel greater distances than the inner sowing modules. Said disadvantages were addressed by the use of sowing modules that utilize hydraulic and/or electric systems for driving and controlling each disk individually, as described for example in US application No 2015/334913 A1 of Gentili Jorge Alberto, published on Nov. 26, 2015.

The use of hydraulic and electric systems for driving the disks additionally allows for a more specialized control of the sowing or metering of granulates, in which the metering operation of each module can be controlled individually not only as a function of the movement or path of the sowing machine, but also as a function of data or characteristics of the soil in which the sowing is taking place, such as for example yield maps of the soil.

However, since each sowing module comprises a single metering disk, said sowing machines can only sow one type of granulate per furrow, they cannot change the granulate type during the sowing process, and require a granulate change process in order to sow another type of granulate.

Sowing machines are known in the art comprising sowing modules for double metering, also referred to as dual meters or double meters, which allow for a sowing machine to lay more than one type of seed or other granulate material, such as fertilizer, in a simultaneous, selective or alternative manner, in a single furrow or in adjacent furrows, without the need for stopping or delaying the sowing process. The selection of the type of granulate and the metering operation can be controlled as a function of the path of the sowing machine and from data of the soil such as yield maps and other relevant parameters.

In general, said double metering sowing modules comprise an individual drive and control system which allow for an on board computer of the sowing machine to control the selection of the type of seed and the metering of the same. However, double metering systems known in the art utilize complex mechanical and electronic systems for the selection and metering of the desired granulate, which are inefficient and/or present a delay between the selection of the granulate to be sowed and the effective sowing of said selected granulate. One of said double meters is described in US patent application No 2015/289441 A1 of Great Plains Manufacturing, Inc., published on Oct. 15, 2015. Said application describes a double seed metering device which comprises two metering discs, one for each type of seed, and respective seed reservoirs, and which is capable of selecting and planting seeds from two different seed types, by electronic commutation of a coaxial multiple clutch mechanism. While the device described in said application is capable of switching between seed types in an instantaneous or near-instantaneous manner, the clutch mechanism used to control the selective rotation of both discs is bulky and complex. Additionally, since the motor driving the disc is not coaxial with the same, the device requires a drivetrain to deliver power from the motor to the disc axis, which entails a loss of power, an increment in noise and more frequent and more expensive maintenance.

Another double seed metering device known in the art is the device described in US patent application No 2015/351315 A1 of CNH Industrial America LLC, published on Dec. 10, 2015. Said application describes a double seed metering device comprising two seed meters, one for each type of seed, and respective seed reservoirs, which is capable of selecting and planting seeds from between two types of different seeds, by means of the electronic commutation of clutches in the respective discs. Similarly to the application previously mentioned, the driving source is not arranged coaxially with the axis of the discs, and therefore requires a power drivetrain to drive them, which entails the disadvantages previously mentioned.

Simpler double metering devices are known in the art, as described in US patent application 2010/282144 A1 of Agro Corporation, published on Nov. 11, 2010. Said patent application describes a seed meter capable of sowing two types of seeds simultaneously, in a same furrow or in adjacent furrows. Said device comprises two coaxial metering discs, respective seed reservoirs and a driving source. While said device does not comprise a complicated clutch system and/or coupling such as the applications previously mentioned, the same is incapable of selectively activating or deactivating one or both of the discs individually.

Therefore, there is a need for double metering devices of simple design and operation, efficient, with lower power requirements and lower manufacture, maintenance and utilization costs, but which allow for total control of the manner and pacing of the sowing of more than one type of seed during operation, with instantaneous selection of the type of seed, without stopping the equipment and without manual mechanical adjustments.

BRIEF DESCRIPTION OF THE INVENTION

With the object of satisfying the above mentioned needs, the present invention provides a dual or double seed metering device, for sowing two different types of granulates or seeds in a single furrow, which comprises two seed reservoirs and two metering discs driven by a single coaxial motor of annular or toroidal shape with a hollow shaft, located between both metering discs, and which can be commanded from a distance for selectively sowing from one of two seed types, or from both seed types simultaneously, without a delay between the selection of the seed type and the effective sowing of the same, and without stopping the sowing operation during selection. In preferred embodiments of the present invention, said annular motor is an electric direct drive, direct current motor, with high torque and brushless.

Said seed metering device for sowing machines comprises two chambers or seed reservoirs, each loaded with seeds of different types. Each one of said chambers comprises a seed metering disc for capturing seeds from their respective chambers or reservoirs and laying them in a controlled manner in a furrow on the ground. In preferred embodiments of the present invention, the means for capturing and releasing seeds in the metering discs operate by the generation of vacuum or positive pressure.

The use of a single coaxial motor with great torque directly driving the two metering discs of the dual seed metering device of the present invention avoids the need for reductions, gear transmissions, belt transmissions and other auxiliary transmission components such as those found in the seed metering devices known in the art that do not use a coaxial motor. This reduction or complete absence of a mechanical transmission between the power source and the load entails a substantial reduction in the loss of power, which in turns results in improved use of output power, noise and vibration reduction and overall greater efficiency. Additionally, placing the single motor between both discs for driving the same avoids the need to use a motor to drive each disc, as well as the need for complex transmission systems, such as two coaxial shafts one inside the other, such as in the devices with a single motor known in the art.

This reduction or elimination of auxiliary transmission element and additional motors greatly reduces the manufacturing cost and complexity, acquisition and maintenance costs of the device of the present invention, as well as improving its lifespan.

Furthermore, the slim design of the high torque annular motors allows for arranging the motor partially or completely inside the housing or casing of the seed metering device, reducing the overall size of the device and partially or totally protecting the motor from external elements.

Consequently, it is an object of the present invention to provide a dual seed metering device for a sowing machine capable of selectively sowing two types of different seeds or granulates, wherein the device comprises:

a) a first and a second substantially cylindrical housings, horizontally and coaxially arranged, each housing comprising therein a seed reservoir and a seed metering disc, where the seed metering disc of each housing can rotate about a central axis and divides the housing into a first chamber and a second chamber, and wherein the seed metering disc comprises a plurality of seed capturing and retaining means for capturing and retaining seeds from their corresponding seed reservoirs, and wherein the seed metering disc further comprises releasing means for releasing seeds from said seed capturing and retaining means;

b) at least one air duct for providing to, or extracting air from, said second chambers of the first and second housings, so as to generate an air pressure difference between the first chamber and the second chamber in each of the first and second housings;

c) an electric motor with a hollow shaft, coaxially arranged between said two housings, the hollow shaft of motor extending outwardly from both sides of the motor, and being connected to each seed metering disc inside the first and second housings by means of respective clutches, the hollow shaft of the motor being also provided with a plurality of orifices so as to provide fluid connection between the second chamber of the first housing and the second chamber of the second housing; and d) seed output ducts connected to each one of the first and second housings.

In a preferred embodiment of the present invention, the at least one air duct consists of a first duct fluidly connected to the second chamber of the first housing, and a second duct fluidly connected to the second chamber of the second housing.

In a preferred embodiment of the present invention, the at least one air duct consists of a single air duct, fluidly connected to the second chamber of only one of the first and second housings.

In a preferred embodiment of the present invention, the at least one air duct consists of a single air duct, fluidly connected to the hollow shaft of the motor.

In a preferred embodiment of the present invention, the air ducts are further fluidly connected to positive pressure generating means, so as to provide the second chambers of the first and second housings with an air pressure greater than the air pressure in the first chamber, thus generating the air pressure difference between the first chamber and the second chamber in each of the first and second housings; and wherein the seed output ducts of each first and second housing are fluidly connected to the corresponding second chamber of said first and second housings, and the seed reservoirs of the first and second housings are located within the second chamber of said first and second housings.

In a preferred embodiment of the present invention, the air ducts are further fluidly connected to vacuum, generating means, so as to provide the second chambers of the first and second housings with an air pressure lower than the air pressure in the first chamber, thus generating the air pressure difference between the first chamber and the second chamber in each of the first and second housings; wherein the seed output ducts of each housing are fluidly connected to the corresponding first chamber of said housings, and the seed reservoirs of the first and second housings are located within the first chamber of said housings.

In a preferred embodiment of the present invention, the air pressure in the first chambers of the first and second housings is approximately the atmospheric pressure.

In a preferred embodiment of the present invention, the seed capturing and retaining means of the seed metering discs comprise pass-through orifices for capturing seeds from the reservoirs thereof by means of the air pressure difference between the air pressure in the first chamber and the air pressure in the second chamber of each of the first and second housings, wherein the diameter of the orifices is such that they can capture and retain seeds but without allowing them to pass through the said orifices.

In a preferred embodiment of the present invention, the clutches that connect the hollow shaft of the motor to the corresponding seed metering discs of the first and second housings are unidirectional mechanical clutches, arranged in opposite orientation, such that in one direction of rotation of the shaft one clutch will not transmit power from the motor to its corresponding seed metering disc and in an opposite direction of rotation of the shaft the other clutch will not transmit power from the motor to its corresponding seed metering disc.

In a preferred embodiment of the present invention, the clutches that connect the hollow shaft of the motor to the corresponding seed metering discs of the first and second housings are electronically controlled magnetic clutches, which can independently disable or allow the transmission of power from the motor to each of the seed metering discs.

In a preferred embodiment of the present invention, the clutches that connect the hollow shaft of the motor to the corresponding seed metering discs of the first and second housings are unidirectional mechanical clutches, arranged in opposite orientation, such that in one direction of rotation of the shaft one of the clutches will not transmit power from the motor to its corresponding seed metering disc and in an opposite direction of rotation of the shaft the other clutch will not transmit power from the motor to its corresponding seed metering disc, and wherein one of the unidirectional mechanical clutches is connected to its corresponding seed metering disc by means of a planetary or epicyclic gear train, which inverts the direction of rotation of said seed metering disc in relation to the rotation direction of its corresponding clutch.

In a preferred embodiment of the present invention, the releasing means for releasing the seeds from the seed capturing and securing means comprises a wheel made of flexible material, arranged on the side of the seed metering discs opposite the seeds, which locally interrupt the air pressure difference on the seed capturing and retaining means, causing the release of the seeds.

In a preferred embodiment of the present invention, each of the seed metering discs comprise singulating means to prevent the simultaneous capture and release of two or more seeds from the seed capturing and retaining means, remove excess of captured seeds and return them to their corresponding reservoir.

In a preferred embodiment of the present invention, the singulating means comprise curved plates, which are each arranged on the side of their corresponding seed metering disc in which the seeds are located.

In a preferred embodiment of the present invention, each of the seed metering discs comprise auxiliary ejection and cleaning means, which clean and remove obstructions from the seed capturing and retaining means, and eject seeds which were not properly released by the releasing means.

In a preferred embodiment of the present invention, the auxiliary ejection and cleaning means comprise a toothed wheel made of flexible material arranged on the side of the discs opposite the seeds.

In a preferred embodiment of the present invention, the hollow shaft motor is a direct drive, direct current brushless motor.

DEFINITIONS

Figure 1:
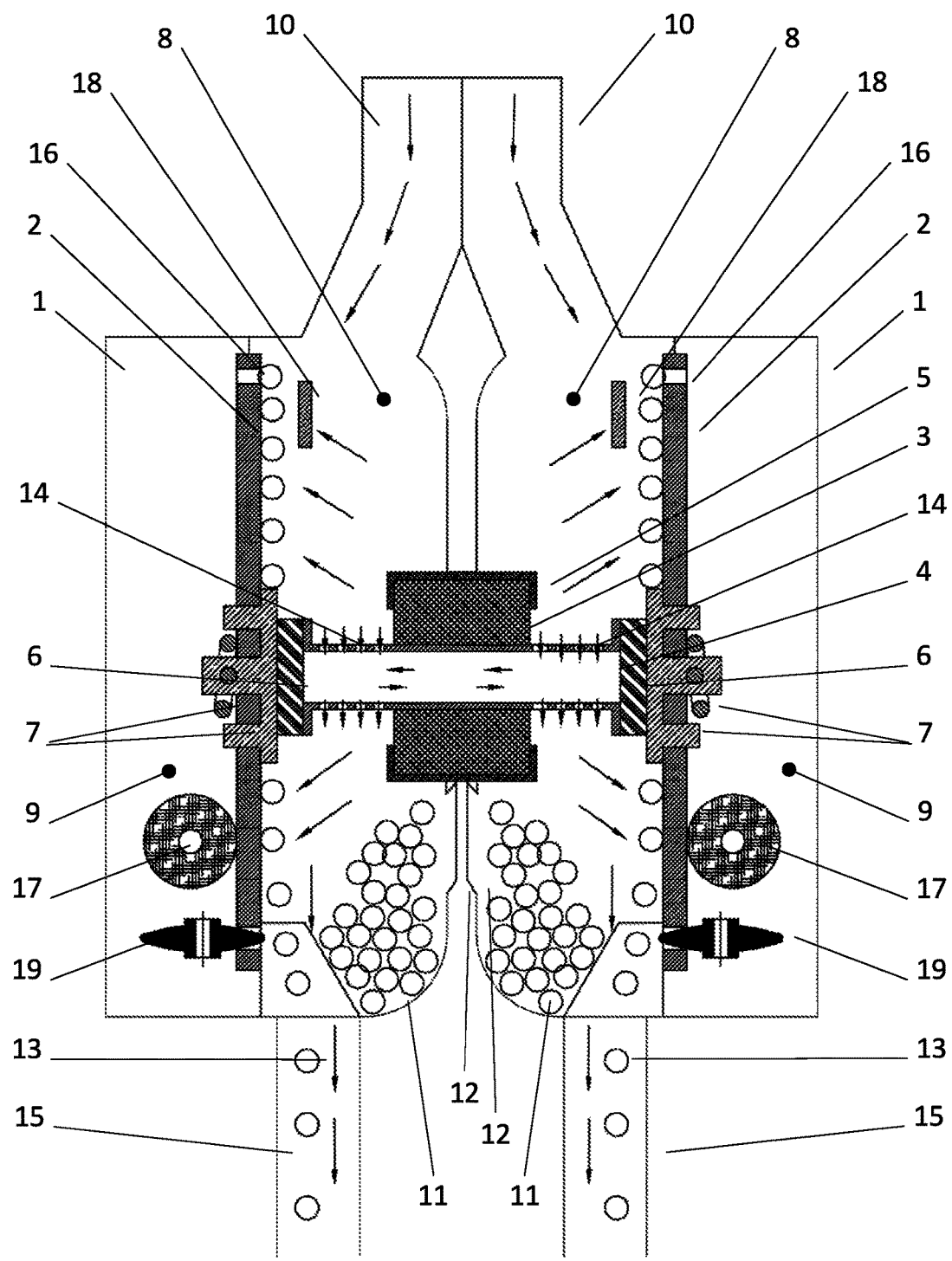
FIG. 1 is a schematic cross section view of the dual seed metering device according to a first embodiment of the present invention, using two air ducts.

To the effects of the present invention, the terms "fluid connection", "connected in a fluid manner", "fluidly connected", and variations thereof are to be understood as connections or couplings that allow for or maintain fluid flow, in particular air flow, between connected elements.

Additionally, the terms "seed", "grain", "granulate" and their derivatives are to be understood as generally referring to any granulate sowing material known in the art which can be sowed using metering discs, such as seeds, fertilizers or the like.

For all embodiments described in the present invention, and any other embodiment comprised within the scope of the same, the term "atmospheric pressure chamber" is to be understood as making reference to a chamber the pressure of which is close to the atmospheric pressure, and it is not under positive pressure or vacuum.

The terms "positive pressure" and "high pressure" are used indistinctively throughout the specification and are to be understood as making reference to pressures which are higher than the pressure in the atmospheric pressure chamber. Likewise, the terms "vacuum" and "low pressure" are used indistinctively throughout the specification and are to be understood as making reference to pressures which are lower than the pressure in the atmospheric pressure chamber. As such, while in preferred embodiments of the present invention the pressure within the atmospheric pressure chamber is actually the atmospheric pressure, they should not be considered as limiting examples of the invention, and it should be understood that the pressure inside the atmospheric pressure chamber may not be equal to the atmospheric pressure (1 atmosphere of pressure) without departing from the concept and functionality of the device of the present invention, provided the same is lower than the "positive pressure" and greater than the "vacuum" or "low pressure".

The terms "positive pressure generating means", "vacuum generating means" and equivalent terms are to be understood as generally referring to any element, device or means capable of providing a pneumatic pressure greater or lower than the atmospheric pressure, respectively, which may be for example compressors, vacuum pumps, turbines, blowers, fans, among others.

The terms "toroidal motor", "annular motor" or "torque motor" are to be understood as referring to relatively slim motors in which the shaft or rotor comprises a hole passing through its central axis. Furthermore, the term "pass-through shaft" in reference to the shaft of motor is such that it extends outwardly from both sides of the motor.

The terms "fixing means", "securing means", "fastening means", "suitable fixing means", "suitable securing means", "suitable fastening means" and similar terms referring to means for joining elements together are to be understood as generally referring to any fixing or fastening means known in the art, such as bolts, cotter pints, screws, rivets, adhesive, etc. which can be used to adequately fasten or join the relevant elements without affecting the performance of the present invention.

DETAILED DESCRIPTION OF THE INVENTION

Preferred embodiments of the dual seed metering device of the present invention will be described in detail below, with reference to the accompanying drawings.

In some preferred embodiments of the present invention, the "atmospheric pressure chamber" may be fluidly connected to the outside of the device by suitable fluid connection means, such as holes or ducts.

Pressure Metering Embodiment

Figure 2:
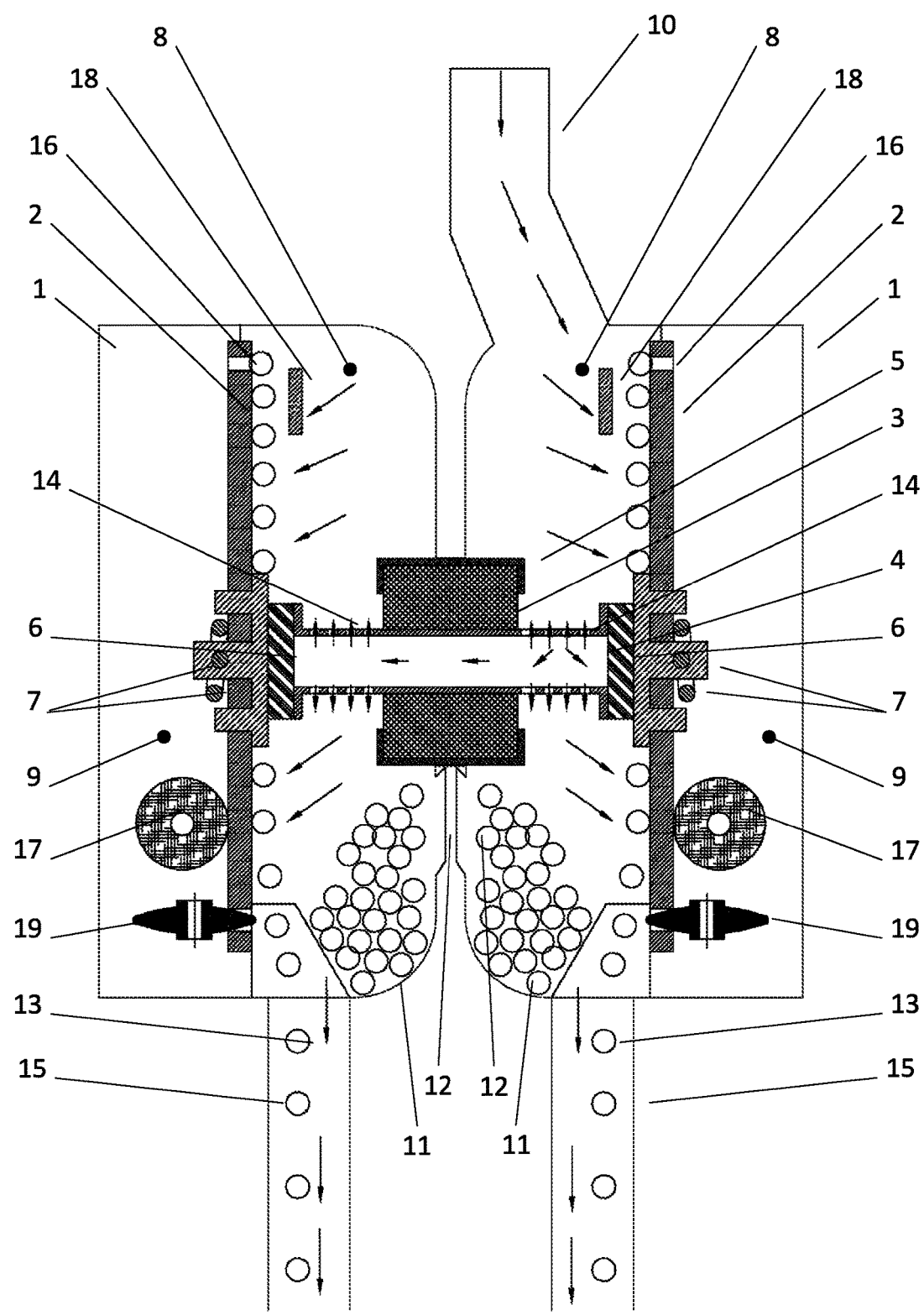
FIG. 2 is a schematic cross section view of the dual seed metering device according to a first embodiment of the present invention, using a single air duct.
Figure 3:
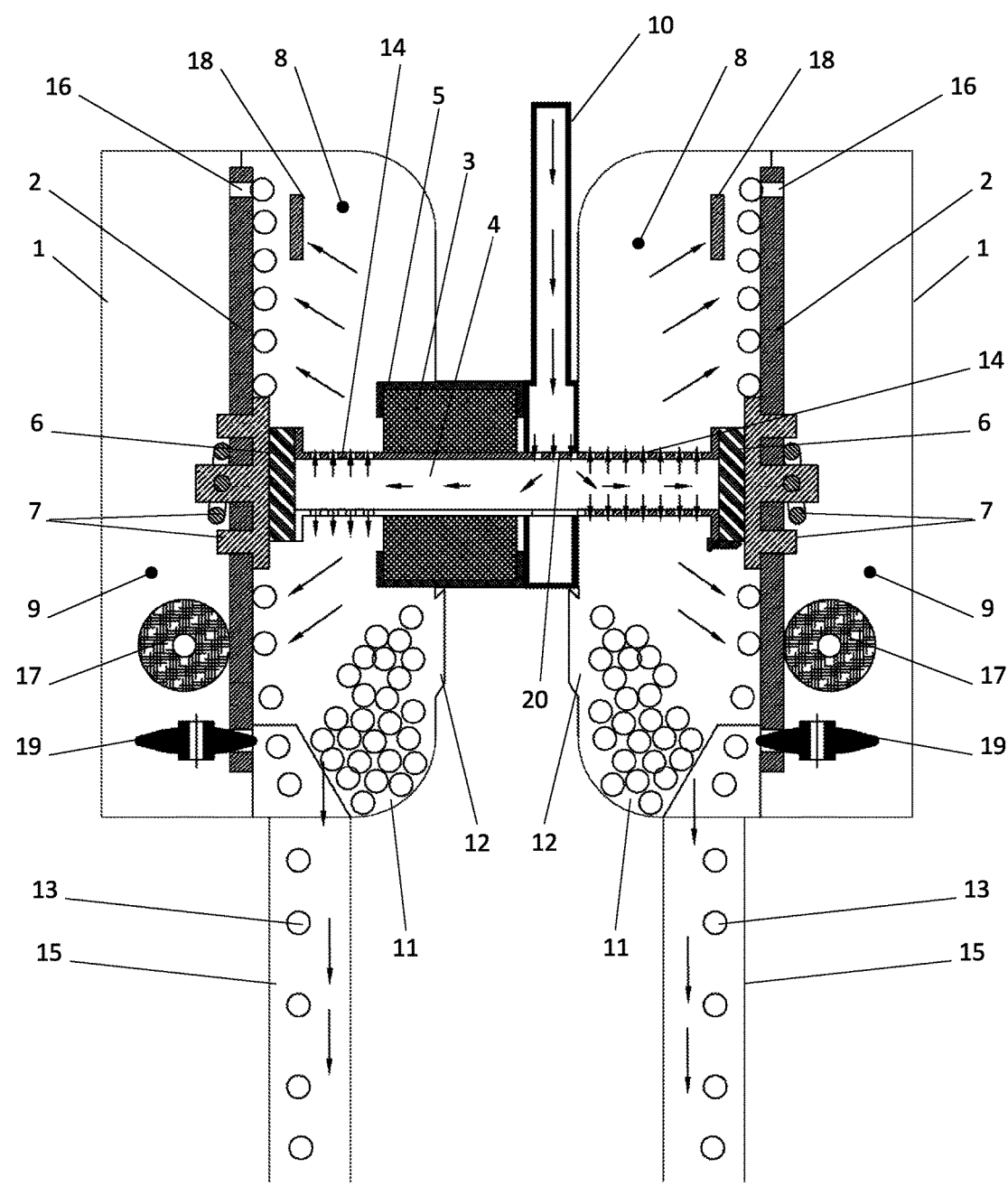
FIG. 3 is a schematic cross section view of the dual seed metering device according to a first embodiment of the present invention, using a single air duct linked directly to the shaft of the annular motor.

FIGS. 1 to 3 show a dual seed metering device operated by positive pressure according to a first embodiment of the present invention. Said device comprises two substantially cylindrical housings or casings (1) horizontally and coaxially arranged side by side, each of them housing within a seed metering disc (2). Between said cylindrical housings (1) an annular motor (3) with a hollow shaft (4) is arranged, coaxial with said housings (1). The annular motor (3) is secured by its stator (5) to an exterior part of said housings (1) by means of suitable fastening means (not shown). The hollow shaft (4) of the annular motor (3) is a pass-through shaft that extends towards both sides thereof, penetrating inside each of the housings (1) reaching the corresponding seed metering discs (2) inside said housing (1). Each of the seed metering discs (2) within the housings (1) is coaxially coupled to a corresponding end of the pass-through hollow shaft (4) of the annular motor (3) by means of a corresponding clutch (6). The coupling between said seed metering discs (2) and their corresponding clutches (6) is done by means of a cotter pin and hub (7) or another suitable fastening means. Additionally, said clutches (6) are coupled to the hollow shaft (4) of the annular motor (3) by means of suitable fastening means (not shown).

According to the first embodiment of the invention, each of the seed metering discs (2) divides the inner volume of its corresponding housing (1) in two chambers: a first chamber (9), also referred to as the atmospheric pressure chamber (9) and a second chamber (8), also referred to as the positive pressure chamber (8). A plurality of radial orifices (14) arranged on the hollow shaft (4) of the annular motor (3) allow for a fluid connection between the positive pressure chamber (8) of each housing (1), in order to equalize the pressure between them.

Said positive pressure chambers (8) are fluidly connected to positive pressure generating means (not shown), by means of one or more air ducts (10) arranged on one or both of the housings (1). According to a more preferred embodiment of the present invention, the amount and location of each of said one or more air ducts (10) may be:

two air ducts (10), located one on each housing (1), as shown in FIG. 1;

a single air duct (10), located in one of the housings (1), as shown in FIG. 2; and a single air duct (10), located between one of the housings (1) and the annular motor (3), fluidly connected with both positive pressure chambers (8) through the hollow shaft (4) by means of a plurality of orifices (20), as shown in FIG. 3.

Each one of the housings (1) further comprises a seed reservoir (11) and a seed loading inlet (12) in their corresponding positive pressure chamber (8), which may or may not comprise a hopper and/or closing means (not shown), from where seeds (13) are loaded into said seed reservoirs (11) inside said positive pressure chambers (8). Each housing (1) further comprises a seed outlet duct (15), connecting the positive pressure chambers (8) to the means or ducts for laying of the seeds in the furrow (not shown)

Each of said seed metering discs (2) comprises a plurality of seed capturing and retaining means (16), radially spaced, in its perimeter region. Said seed capturing and retaining means (16) capture and retain seeds (13) by using the pressure difference between both sides of the corresponding seed metering disc (2), i.e. the difference between the positive pressure in the positive pressure chamber (8) created by the pressure generating means (not shown) and the atmospheric pressure in the atmospheric pressure chamber (9). In a more preferred embodiment of the present invention, said seed capturing and retaining means (16) comprise pass-through orifices, with a diameter such that they can capture and retain the seeds (13) but without allowing them to pass through the said orifices. During rotation of the seed metering discs (2), as driven by the annular motor (3), the seed capturing and retaining means (16) will capture seeds (13) from the corresponding seed reservoir (11) of each seed metering disc (2), and transport said captured seeds (13) towards corresponding seed outlet ducts (15).

During operation of the device, a positive pressure is generated in both positive pressure chambers (8) by the injection of high pressure air into said chambers (8) from the positive pressure generating means (not shown), through the corresponding air duct(s) (10). Furthermore, the positive pressure chambers (8) receive a supply of seeds (13) into their corresponding seed reservoir (11) through corresponding seed loading inlets (12). Each of the seed reservoirs (11) may be filled with a different type of seeds, or with the same type of seeds. Both atmospheric pressure chambers (9) will remain at substantially atmospheric pressure. The annular motor (3) is then activated in order to rotate in a predetermined rotation direction, thus driving the seed metering discs (2) through the corresponding clutches (6).

As the seed metering discs (2) rotate, driven by the annular motor (3), the pressure difference between both sides of the seed metering discs (2) allow the seed capturing and retaining means (16) of the seed metering discs (2) to capture seeds (13) from the corresponding seed reservoirs (11) and transport them. Said seeds (13) are retained and transported by the seed capturing and retaining means (16) of the seed metering discs (2) until, at a predetermined position of their path, corresponding pressure interruption means (17), i.e. seed releasing means (17), locally interrupt the pressure difference on said seed (13). This causes the release of the seeds (13) at said point, which fall towards corresponding seed outlet ducts (15) and then towards an open furrow (not shown) on the ground or another section of the sowing equipment (no shown).

In a more preferred embodiment of the present invention, said pressure interruption means (17) comprise corresponding wheels made of flexible material, such as rubber or other polymeric material, which are each located on the sides of the seed metering discs (2) opposite the seeds (13), i.e. on the atmospheric pressure chamber (9) side.

The device of the present invention further comprises two singulating means (18), one for each seed metering disc (2), which serve to prevent the simultaneous capture and release of two or more seeds (13) from a single seed capturing and retaining means (16), removing excess seeds (13) and returning them to their corresponding seed reservoir (11).

In a more preferred embodiment of the present invention, said singulating means (18) each comprise a curved plate, arranged on the side of their corresponding seed metering disc (2) in which the seeds (13) are located, i.e. on the positive pressure chamber (8) side.

Additionally, the device of the present invention comprises two corresponding auxiliary ejection and cleaning means (19), one for each seed metering disc (2), which serve the dual function of cleaning and removing obstructions in the seed capturing and retaining means (16), and also ejecting seeds (13) which were not properly released by the pressure interruption means (17).

In a preferred embodiment of the present invention, said auxiliary ejection and cleaning means (19) comprise corresponding toothed wheels made of flexible material, such as rubber or other polymeric materials, each one arranged on a side of the corresponding seed metering disc (2) opposite the seeds (13), i.e. on the atmospheric pressure chamber (9) side.

Since each of the seed reservoirs (11) is preferably loaded with different types of seeds (13), the selective individual rotation control of each seed metering disc (2) allows for a selective distribution of seeds from each reservoir (11). Therefore, the dual seed metering device of the present invention provides several ways in which the selective individual rotation control of each seed metering disc (2) can be carried out.

In a first aspect of the first embodiment of the present invention, each of the clutches (6) that connect the seed metering discs (2) to corresponding ends of the hollow shaft (4) of the annular motor (3) are unidirectional mechanical clutches, which allow rotation of the seed metering discs (2) in one direction and disable rotation of the same in the other direction. The two unidirectional clutches (6) are arranged in opposite directions to one another, i.e. one of the clutches (6) connected to one of the seed metering discs (2) allows rotation in a first direction and disables rotation in a second direction, while the other clutch (6) connected to the other seed metering disc (2) disables rotation in the first direction and allows rotation in the second direction. This arrangement results in that, depending on the rotation direction of the annular motor (3), one of the seed metering discs (2) will be driven by the annular motor (3) while the other seed metering disc (2) will not be driven, i.e. it will not rotate and stay immobile. In this arrangement, the rotation direction of the annular motor (3) will determine which of the seed metering discs (2) will be driven. Both seed metering discs (2) cannot be driven simultaneously, and both discs, when individually rotating, they do so in opposite directions.

The use of unidirectional clutches allows the onboard computer (not shown) of the sowing machine to select which of the seed metering discs (2) will be driven by the annular motor (3), and consequently, which of the two types of seeds are to be sown, by controlling the rotation direction of the annular motor (3), as stated above. By way of example, in a first selection of seeds to be sown, the annular motor (3) is rotated in a first rotation direction, whereby a first metering disc of the seed metering discs (2) will be driven to rotate and capture and release seeds from its corresponding seed reservoir (11) while the second metering disc of the seed metering discs (2) remains immobile. In a second selection to the seed to be sow, the annular motor (3) is rotated in a second, opposite rotation direction, whereby the second metering disc of the seed metering discs (2) will be driven to rotate and capture and release seeds from its corresponding seed reservoir (11) while the first metering disc of the seed metering discs (2) remains immobile.

Since the rotation direction of both seed metering discs (2) are opposed, the corresponding seed outlet ducts (15) of each housing (1) are provided on opposite sides of the device.

In a second aspect of the first embodiment of the present invention, each of the clutches (6) that connect the seed metering discs (2) to corresponding ends of the hollow shaft (4) of the annular motor (3) are magnetic clutches, electronically controlled by means of an electronic system or onboard computer (not shown), which may be controlled individually to disable or allow rotation of the corresponding seed metering discs (2).

The use of electronically controlled magnetic clutches allows the onboard computer (not shown) of the sowing machine to select the seed metering disc (2) to be driven, and consequently, the type of seed to be sown, by electronic control of the coupling and/or decoupling of each of the magnetic clutches (6) individually. By way of an example, in a first selection of seeds to be sown, a first clutch of the two clutches (6) is electronically coupled and a second clutch of the two clutches (6) is electronically decoupled. This allows for a first metering disc of the seed metering discs (2), which is connected to said first clutch, to be driven by the annular motor (3) to rotate and capture and release seeds from its corresponding seed reservoir (11) while a second metering disc of the seed metering discs (2), which is connected to said second clutch, remains immobile. In a second selection of seeds to be sown, the first clutch is electronically decoupled and a second clutch is electronically coupled. This allows for the second metering disc, which is connected to said second clutch, to be driven by the annular motor (3) in order to rotate and capture and release seeds from its corresponding seed reservoir (11) while the first metering disc, which is connected to said first clutch, remains immobile.

Since the rotation direction of both seed metering discs (2) is the same, the corresponding seed outlet ducts (15) of each housing (1) are provided on the same side of the device.

In a third aspect of the first embodiment of the present invention, each of the clutches (6) that connect the seed metering discs (2) to corresponding ends of the hollow shaft (4) of the annular motor (3) are unidirectional mechanical clutches, which allow rotation of the seed metering discs (2) in one direction and disable rotation of the same in the other direction. The two unidirectional clutches (6) are arranged in opposite directions related to one another, i.e. one of the clutches (6) connected to one of the seed metering discs (2) allows rotation in a first direction and disables rotation in a second direction, while the other clutch (6) connected to the other seed metering disc (2) disables rotation in the first direction and allows rotation in the second direction. This arrangement results in that, depending on the rotation direction of the annular motor (3), one of the seed metering discs (2) will be driven by the annular motor (3) while the other seed metering disc (2) will not be driven, i.e. will not rotate and stay immobile. Additionally, between one of the seed metering discs (2) and its corresponding clutch (6), the device of the present invention further comprises a planetary or epicyclic gear train, which inverts the direction of rotation of said seed metering disc (2) in relation to the rotation direction of the hollow shaft (4).

In this arrangement, the rotation direction of the annular motor (3) will determine which of the seed metering discs (2) will be driven and both seed metering discs (2) cannot be driven simultaneously. However, in contrast to the first aspect of the first embodiment of the present invention, both discs, when individually rotating, will do so in the same direction.

The use of unidirectional clutches together with the planetary or epicyclic gear train allows an onboard computer (not shown) of the sowing machine to select which of the seed metering discs (2) will be driven by the annular motor (3), and consequently, which of the two types of seeds to be sown by means of controlling the rotation direction of the annular motor (3). By way of an example, in a first selection of seeds to be sown, the annular motor (3) is rotated in a first rotation direction, whereby a first metering disc of the seed metering discs (2) will be driven to rotate and capture and release seeds from its corresponding seed reservoir (11) while the second metering disc of the seed metering discs (2) remains immobile. In a second selection of the seeds to be sow, the annular motor (3) is rotated in a second, opposite rotation direction, whereby the second metering disc of the seed metering discs (2) will be driven to rotate and capture and release seeds from its corresponding seed reservoir (11) while the first metering disc of the seed metering discs (2) remains immobile.

Since in this aspect of the first embodiment both seed metering discs (2) rotate in the same direction, the corresponding seed outlet ducts (15) of each housing (1) are provided on the same sides of the device.

Vacuum Metering Embodiment

Figure 4:
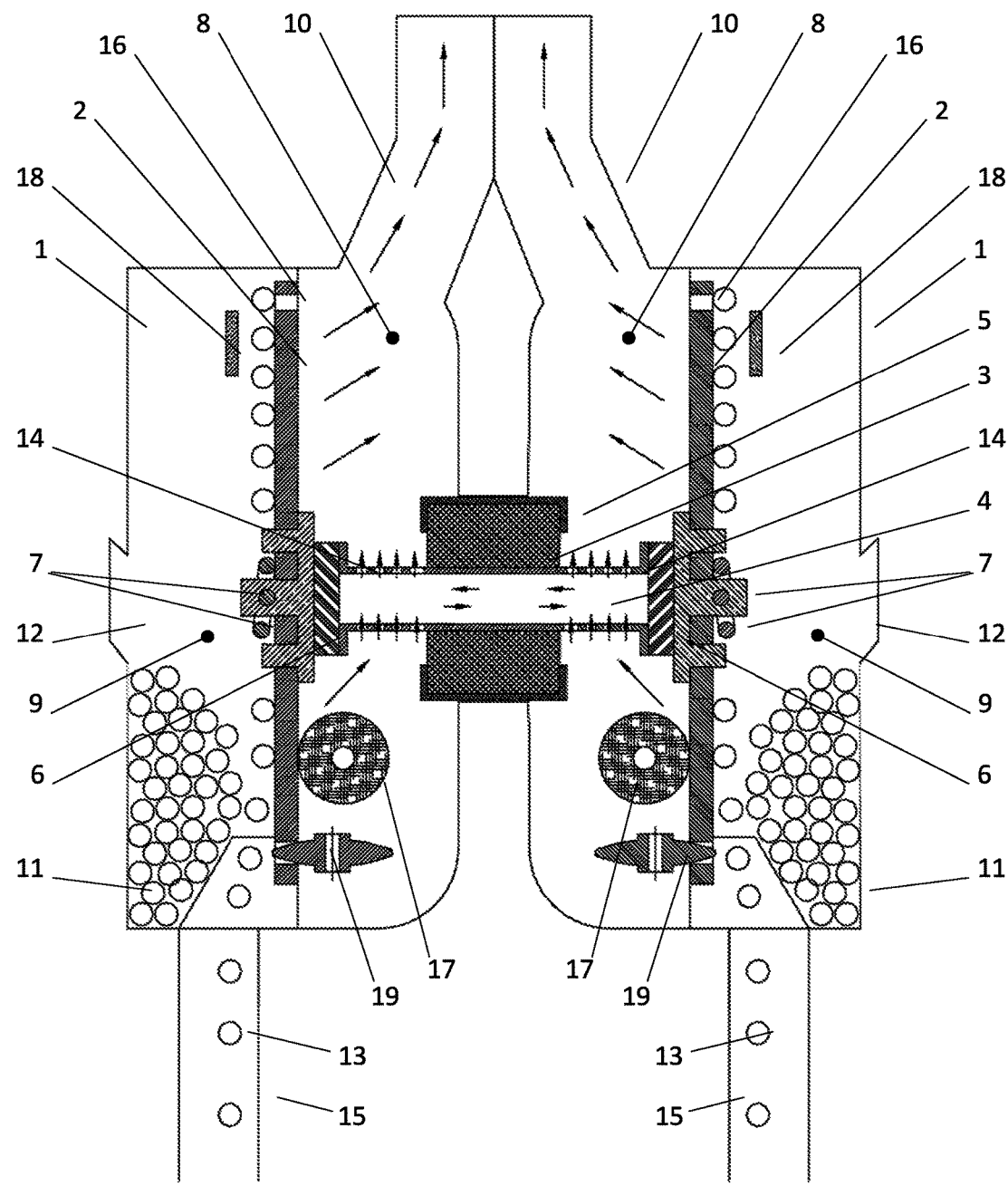
FIG. 4 is a schematic cross section view of the dual seed metering device according to a second embodiment of the present invention, using two air ducts.
Figure 5:
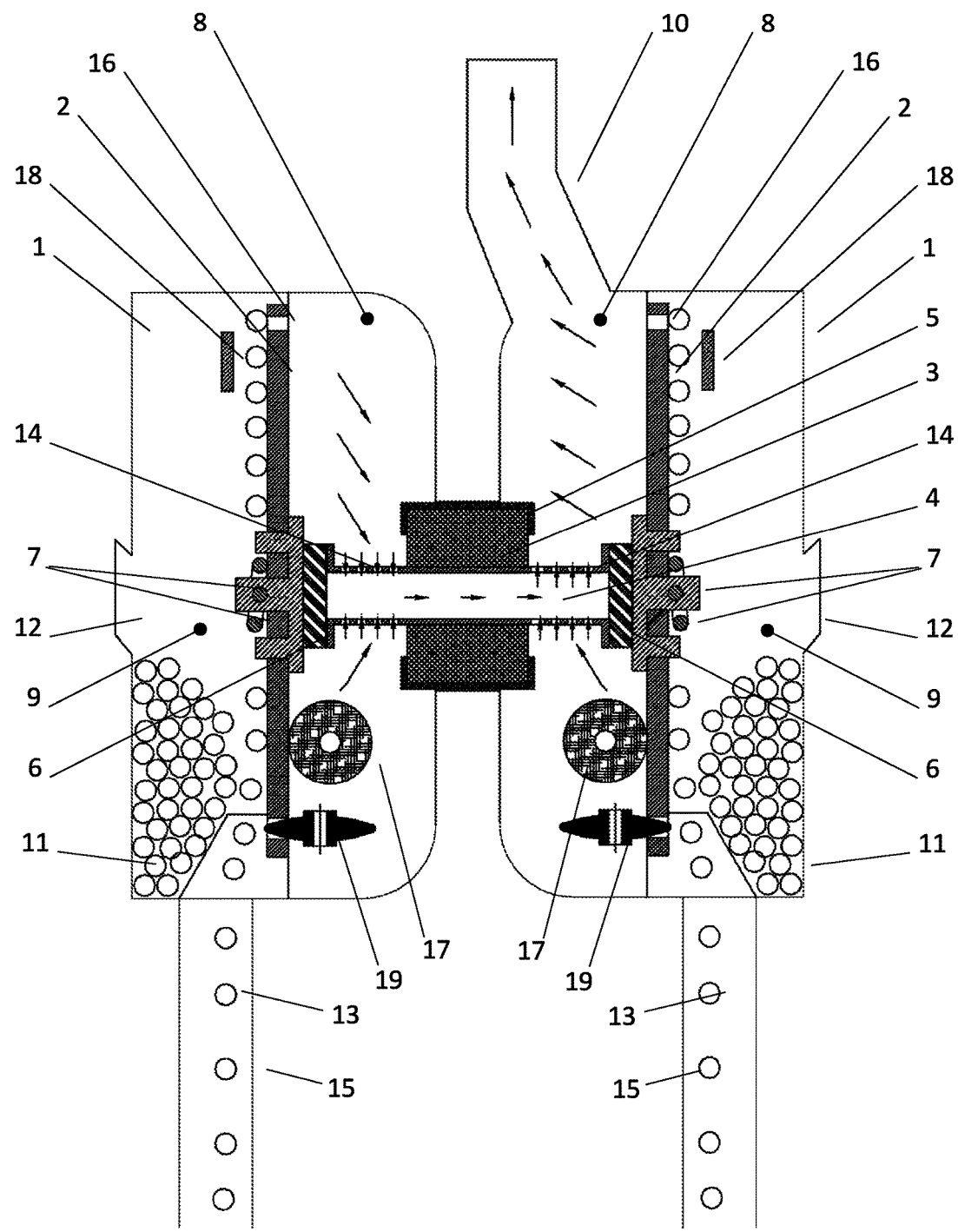
FIG. 5 is a schematic cross section view of the dual seed metering device according to a second embodiment of the present invention, using a single air duct.
Figure 6:
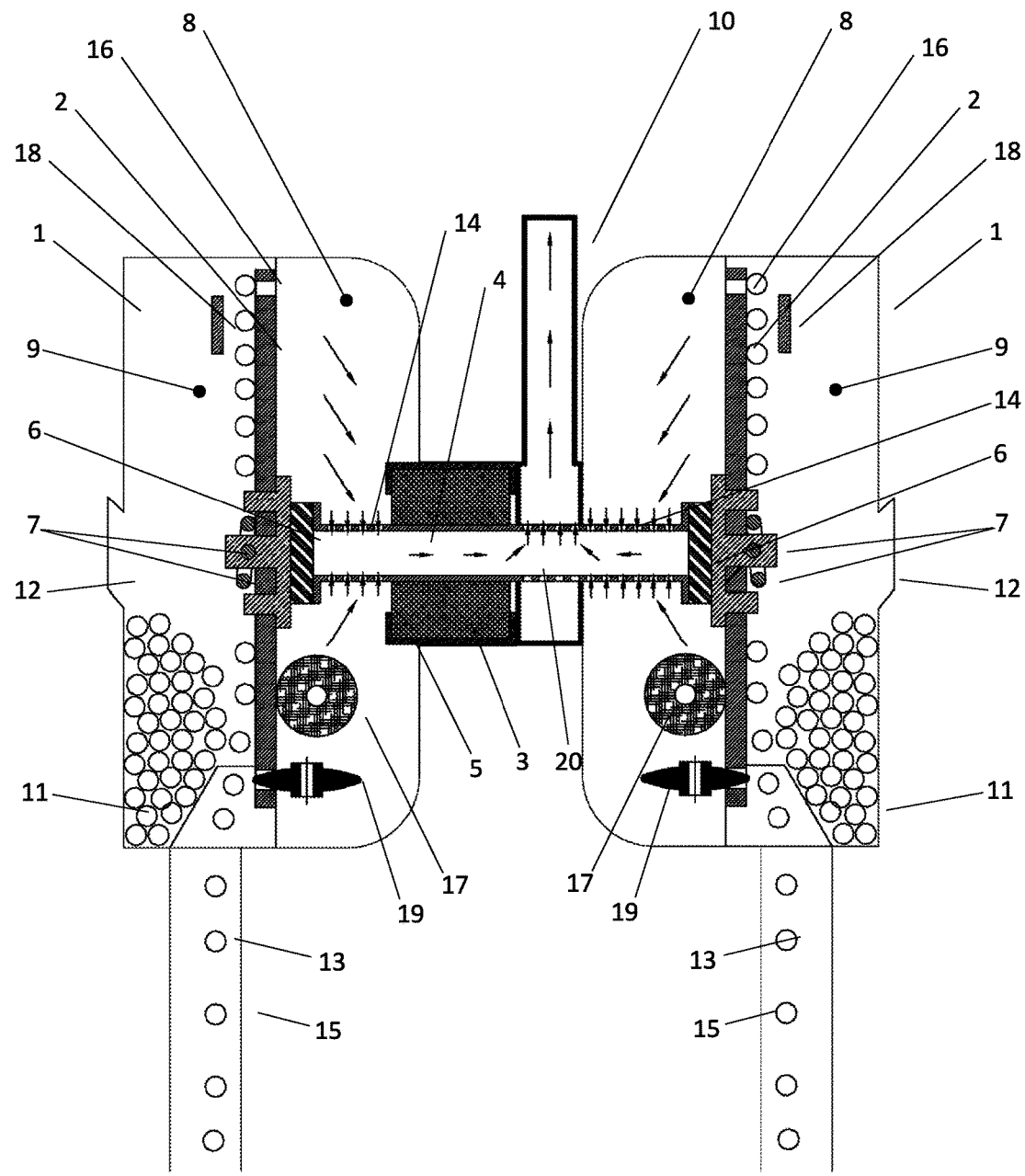
FIG. 6 is a schematic cross section view of the dual seed metering device according to a second embodiment of the present invention, using a single air duct linked directly to the shaft of the annular motor.

FIGS. 4 to 6 show a dual seed metering device operated by vacuum according to a second embodiment of the present invention. Said device comprises two substantially cylindrical housings or casings (1) horizontally and coaxially arranged side by side, each of them housing within a seed metering disc (2). Between said cylindrical housings (1) an annular motor (3) with a hollow shaft (4) is arranged, coaxial with said housings (1). The annular motor (3) is secured by its stator (5) to an exterior part of said housings (1) by means of suitable fastening means (not shown). The hollow shaft (4) of the annular motor (3) is a pass-through shaft that extends towards both sides thereof, penetrating inside each of the housings (1) reaching the corresponding seed metering discs (2) inside said housing (1). Each of the seed metering discs (2) within the housings (1) is coaxially coupled to a corresponding end of the pass-through hollow shaft (4) of the annular motor (3) by means of a corresponding clutch (6). The coupling between said seed metering discs (2) and their corresponding clutches (6) is done by means of a cotter pin and hub (7) or another suitable fastening means. Additionally, said clutches (6) are coupled to the hollow shaft (4) of the annular motor (3) by means of suitable fastening means (not shown).

According to the second embodiment of the invention, each of the seed metering discs (2) divides the inner volume of its corresponding housing (1) in two chambers: a first chamber (9), also referred to as the atmospheric pressure chamber (9) and a second chamber (8), also referred to as the vacuum chamber (8). A plurality of radial orifices (14) arranged on the hollow shaft (4) of the annular motor (3) allow for a fluid connection between the vacuum chamber (8) of each housing (1), in order to equalize the pressure between them.

Said vacuum chambers (8) are fluidly connected to vacuum generating means (not shown), by means of one or more air ducts (10) arranged on one or both of the housings (1). According to a more preferred embodiment of the present invention, the amount and location of each of said one or more air ducts (10) may be:

two air ducts (10), located one on each housing (1), as shown in FIG. 4;

a single air duct (10), located in one of the housings (1), as shown in FIG. 5; and a single air duct (10), located between one of the housings (1) and the annular motor (3), fluidly connected with both vacuum chambers (8) through the hollow shaft (4) by means of a plurality of orifices (20), as shown in FIG. 6.

Each one of the housings (1) further comprises a seed reservoir (11) and a seed loading inlet (12) in their corresponding atmospheric pressure chamber (9), which may or may not comprise a hopper and/or closing means (not shown), from where seeds (13) are loaded into said seed reservoirs (11) inside said atmospheric pressure chambers (9). Each housing (1) further comprises a seed outlet duct (15), connecting the atmospheric pressure chambers (9) to the means or ducts for laying of the seeds in the furrow (not shown)

Each of said seed metering discs (2) comprises a plurality of seed capturing and retaining means (16), radially spaced, in its perimeter region. Said seed capturing and retaining means (16) capture and retain seeds (13) by using the pressure difference between both sides of the corresponding seed metering disc (2), i.e. the difference between the vacuum in the vacuum chamber (8) created by the vacuum generating means (not shown) and the atmospheric pressure in the atmospheric pressure chamber (9). In a more preferred embodiment of the present invention, said seed capturing and retaining means (16) comprise pass-through orifices, with a diameter such that they can capture and retain the seeds (13) but without allowing them to pass through the said orifices. During rotation of the seed metering discs (2), as driven by the annular motor (3), the seed capturing and retaining means (16) will capture seeds (13) from the corresponding seed reservoir (11) of each seed metering disc (2), and transport said captured seeds (13) towards corresponding seed outlet ducts (15).

During operation of the device, a vacuum is generated in both vacuum chambers (8) by the extraction of air from said chambers (8) from the vacuum generating means (not shown), through the corresponding air duct(s) (10). Furthermore, the atmospheric pressure chambers (9) receive a supply of seeds (13) into their corresponding seed reservoir (11) through corresponding seed loading inlets (12). Each of the seed reservoirs (11) may be filled with a different type of seeds, or with the same type of seeds. Both atmospheric pressure chambers (9) will remain at substantially atmospheric pressure. The annular motor (3) is then activated in order to rotate in a predetermined rotation direction, thus driving the seed metering discs (2) through the corresponding clutches (6).

As the seed metering discs (2) rotate, driven by the annular motor (3), the pressure difference between both sides of the seed metering discs (2) allow the seed capturing and retaining means (16) of the seed metering discs (2) to capture seeds (13) from the corresponding seed reservoirs (11) and transport them. Said seeds (13) are retained and transported by the seed capturing and retaining means (16) of the seed metering discs (2) until, at a predetermined position of their path, corresponding pressure interruption means (17), i.e. seed releasing means (17), locally interrupt the pressure difference on said seed (13). This causes the release of the seeds (13) at said point, which fall towards corresponding seed outlet ducts (15) and then towards an open furrow (not shown) on the ground or another section of the sowing equipment (no shown).

In a more preferred embodiment of the present invention, said pressure interruption means (17) comprise corresponding wheels made of flexible material, such as rubber or other polymeric material, which are each located on the sides of the seed metering discs (2) opposite the seeds (13), i.e. on the vacuum chamber (8) side.

The device of the present invention further comprises two singulating means (18), one for each seed metering disc (2), which serve to prevent the simultaneous capture and release of two or more seeds (13) from a single seed capturing and retaining means (16), removing excess seeds (13) and returning them to their corresponding seed reservoir (11).

In a more preferred embodiment of the present invention, said singulating means (18) each comprise a curved plate, arranged on the side of their corresponding seed metering disc (2) in which the seeds (13) are located, i.e. on the atmospheric pressure chamber (9) side.

Additionally, the device of the present invention comprises two corresponding auxiliary ejection and cleaning means (19), one for each seed metering disc (2), which serve the dual function of cleaning and removing obstructions in the seed capturing and retaining means (16), and also ejecting seeds (13) which were not properly released by the pressure interruption means (17).

In a preferred embodiment of the present invention, said auxiliary ejection and cleaning means (19) comprise corresponding toothed wheels made of flexible material, such as rubber or other polymeric materials, each one arranged on a side of the corresponding seed metering disc (2) opposite the seeds (13), i.e. on the vacuum chamber (8) side.

Since each of the seed reservoirs (11) is preferably loaded with different types of seeds (13), the selective individual rotation control of each seed metering disc (2) allows for a selective distribution of seeds from each reservoir (11). Therefore, the dual seed metering device of the present invention provides several ways in which the selective individual rotation control of each seed metering disc (2) can be carried out.

In a first aspect of the second embodiment of the present invention, each of the clutches (6) that connect the seed metering discs (2) to corresponding ends of the hollow shaft (4) of the annular motor (3) are unidirectional mechanical clutches, which allow rotation of the seed metering discs (2) in one direction and disable rotation of the same in the other direction. The two unidirectional clutches (6) are arranged in opposite directions to one another, i.e. one of the clutches (6) connected to one of the seed metering discs (2) allows rotation in a first direction and disables rotation in a second direction, while the other clutch (6) connected to the other seed metering disc (2) disables rotation in the first direction and allows rotation in the second direction. This arrangement results in that, depending on the rotation direction of the annular motor (3), one of the seed metering discs (2) will be driven by the annular motor (3) while the other seed metering disc (2) will not be driven, i.e. it will not rotate and stay immobile. In this arrangement, the rotation direction of the annular motor (3) will determine which of the seed metering discs (2) will be driven. Both seed metering discs (2) cannot be driven simultaneously, and both discs, when individually rotating, they do so in opposite directions.

The use of unidirectional clutches allows the onboard computer (not shown) of the sowing machine to select which of the seed metering discs (2) will be driven by the annular motor (3), and consequently, which of the two types of seeds are to be sown, by controlling the rotation direction of the annular motor (3), as stated above. By way of example, in a first selection of seeds to be sown, the annular motor (3) is rotated in a first rotation direction, whereby a first metering disc of the seed metering discs (2) will be driven to rotate and capture and release seeds from its corresponding seed reservoir (11) while the second metering disc of the seed metering discs (2) remains immobile. In a second selection to the seed to be sow, the annular motor (3) is rotated in a second, opposite rotation direction, whereby the second metering disc of the seed metering discs (2) will be driven to rotate and capture and release seeds from its corresponding seed reservoir (11) while the first metering disc of the seed metering discs (2) remains immobile.

Since the rotation direction of both seed metering discs (2) are opposed, the corresponding seed outlet ducts (15) of each housing (1) are provided on opposite sides of the device.

In a second aspect of the second embodiment of the present invention, each of the clutches (6) that connect the seed metering discs (2) to corresponding ends of the hollow shaft (4) of the annular motor (3) are magnetic clutches, electronically controlled by means of an electronic system or onboard computer (not shown), which may be controlled individually to disable or allow rotation of the corresponding seed metering discs (2).

The use of electronically controlled magnetic clutches allows the onboard computer (not shown) of the sowing machine to select the seed metering disc (2) to be driven, and consequently, the type of seed to be sown, by electronic control of the coupling and/or decoupling of each of the magnetic clutches (6) individually. By way of an example, in a first selection of seeds to be sown, a first clutch of the two clutches (6) is electronically coupled and a second clutch of the two clutches (6) is electronically decoupled. This allows for a first metering disc of the seed metering discs (2), which is connected to said first clutch, to be driven by the annular motor (3) to rotate and capture and release seeds from its corresponding seed reservoir (11) while a second metering disc of the seed metering discs (2), which is connected to said second clutch, remains immobile. In a second selection of seeds to be sown, the first clutch is electronically decoupled and a second clutch is electronically coupled. This allows for the second metering disc, which is connected to said second clutch, to be driven by the annular motor (3) in order to rotate and capture and release seeds from its corresponding seed reservoir (11) while the first metering disc, which is connected to said first clutch, remains immobile.

Since the rotation direction of both seed metering discs (2) is the same, the corresponding seed outlet ducts (15) of each housing (1) are provided on the same side of the device.

In a third aspect of the second embodiment of the present invention, each of the clutches (6) that connect the seed metering discs (2) to corresponding ends of the hollow shaft (4) of the annular motor (3) are unidirectional mechanical clutches, which allow rotation of the seed metering discs (2) in one direction and disable rotation of the same in the other direction. The two unidirectional clutches (6) are arranged in opposite directions related to one another, i.e. one of the clutches (6) connected to one of the seed metering discs (2) allows rotation in a first direction and disables rotation in a second direction, while the other clutch (6) connected to the other seed metering disc (2) disables rotation in the first direction and allows rotation in the second direction. This arrangement results in that, depending on the rotation direction of the annular motor (3), one of the seed metering discs (2) will be driven by the annular motor (3) while the other seed metering disc (2) will not be driven, i.e. will not rotate and stay immobile. Additionally, between one of the seed metering discs (2) and its corresponding clutch (6), the device of the present invention further comprises a planetary or epicyclic gear train, which inverts the direction of rotation of said seed metering disc (2) in relation to the rotation direction of the hollow shaft (4).

In this arrangement, the rotation direction of the annular motor (3) will determine which of the seed metering discs (2) will be driven and both seed metering discs (2) cannot be driven simultaneously. However, in contrast to the first aspect of the second embodiment of the present invention, both discs, when individually rotating, will do so in the same direction.

The use of unidirectional clutches together with the planetary or epicyclic gear train allows an onboard computer (not shown) of the sowing machine to select which of the seed metering discs (2) will be driven by the annular motor (3), and consequently, which of the two types of seeds to be sown by means of controlling the rotation direction of the annular motor (3). By way of an example, in a first selection of seeds to be sown, the annular motor (3) is rotated in a first rotation direction, whereby a first metering disc of the seed metering discs (2) will be driven to rotate and capture and release seeds from its corresponding seed reservoir (11) while the second metering disc of the seed metering discs (2) remains immobile. In a second selection of the seeds to be sow, the annular motor (3) is rotated in a second, opposite rotation direction, whereby the second metering disc of the seed metering discs (2) will be driven to rotate and capture and release seeds from its corresponding seed reservoir (11) while the first metering disc of the seed metering discs (2) remains immobile.

Since in this aspect of the second embodiment both seed metering discs (2) rotate in the same direction, the corresponding seed outlet ducts (15) of each housing (1) are provided on the same sides of the device.

For all the embodiments previously described, it should be noted that the hollow shaft (4) of the annular motor (3), in addition to allowing the equalization of pressures among the vacuum or positive pressure chambers (8), when appropriate, it also provides a cooling means for the annular motor (3), using the flow of fresh air through the hollow shaft (4) of the same during normal operation of the dual seed metering device.

Additionally, the location of said annular motor (3), arranged coaxially with both housings (1) of the seed metering discs (2), helps reduce the overall size of the device, in contrast with those devices in which the plurality of seed metering discs are arranged linearly one behind the other and partially or completely protects the annular motor (3) from external elements. Furthermore, said coaxial arrangement between the seed metering discs and the annular motor (3) avoids the need for reductions, gear transmissions, belt transmissions, and other auxiliary transmission components, thus reducing noise generation during operation, reducing cost and frequency of maintenance, and generally improves the efficiency of the device.

The embodiments previously described should not be considered as limiting examples of the invention, since the benefits of using dual seed metering devices directly driven by a single direct current, brushless annular or torque motor as described in the present invention, in other embodiments of seed metering devices will be apparent to those skilled in the art. As such, the invention is further suitable for use in other dual seed metering devices, such as for example, devices without a pressure or vacuum source, and which utilize other means to capture, retain and release the seeds, such as teeth, cradles, cells and the like.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

While the invention has been illustrated and described in detail in the drawings and foregoing description, such illustration and description are to be considered illustrative or exemplary and not restrictive. The invention is not limited to the disclosed embodiments. Variations to the disclosed embodiments can be understood and effected by those skilled in the art in practicing the claimed disclosure, from a study of the drawings, the disclosure and the appended claims.

Those skilled in the art will recognize, or be able to ascertain using no more than routine experimentation, many equivalents to the specific embodiments of the invention described herein. Such equivalents are intended to be encompassed by the following claims. All publications, patents and patent applications mentioned in this specification are herein incorporated by reference into the specification to the same extent as if each individual publication, patent or patent application was specifically and individually indicated to be incorporated herein by reference.

The invention claimed is:

1. A dual seed metering device for a sowing machine capable of selectively sowing two types of different seeds or granulates, wherein the device comprises:
   a) a first and a second substantially cylindrical housings, horizontally and coaxially arranged, each housing comprising therein a seed reservoir and a seed metering disc, where the seed metering disc of each housing can rotate about a central axis and divides the inner volume of its corresponding housing into a first chamber and a second chamber, and wherein the seed metering disc of each housing comprises a plurality of seed capturing and retaining means for capturing and retaining seeds from their corresponding seed reservoirs, and wherein the seed metering disc of each housing further comprises releasing means for releasing seeds from said seed capturing and retaining means;
   b) at least one air duct for providing air to, or extracting air from, said second chambers of the first and second housings, so as to generate an air pressure difference between the first chamber and the second chamber in each of the first and second housings;
   c) an electric motor with a hollow shaft, wherein the electric motor is a direct drive, direct current brushless motor, coaxially arranged between said two housings, the hollow shaft of the electric motor extending outwardly from both sides of the electric motor, and being connected to each seed metering disc inside the first and second housings by means of respective clutches, the hollow shaft of the electric motor being also provided with a plurality of orifices so as to provide fluid connection between the second chambers of the first housing and the second chamber of the second housings; and
   d) seed output ducts connected to each one of the first and second housings.

2. The dual seed metering device according to claim 1, wherein the seed capturing and retaining means of the seed metering discs comprise pass-through orifices for capturing seeds from the reservoirs thereof by means of the air pressure difference between the air pressure in the first chamber and the air pressure in the second chamber of each of the first and second housings, generated by the at least one air duct, wherein the diameter of the orifices is such that they can capture and retain seeds but without allowing them to pass through said orifices.

3. The dual seed metering device according to claim 2, wherein the at least one air duct is further fluidly connected to positive pressure generating means, so as to provide the second chambers of the first and second housings with an air pressure greater than the air pressure in the first chamber, thus generating the air pressure difference between the first chamber and the second chamber in each of the first and second housings; and wherein the seed output ducts of each of the first and second housings are fluidly connected to the corresponding second chamber of said first and second housings, and the seed reservoirs of the first and second housings are located within the second chamber of said first and second housings.

4. The dual seed metering device according to claim 3, wherein the at least one air duct consists of a first duct fluidly connected to the second chamber of the first housing, and a second duct fluidly connected to the second chamber of the second housing.

5. The dual seed metering device according to claim 3, wherein the at least one air duct consists of a single air duct, fluidly connected to the second chamber of only one of the first and second housings.

6. The dual seed metering device according to claim 3, wherein the at least one air duct consists of a single air duct, fluidly connected to the hollow shaft of the electric motor.

7. The dual seed metering device according to claim 3, wherein the air pressure in the first chambers of the first and second housings is approximately the atmospheric pressure.

8. The dual seed metering device according to claim 2, wherein the at least one air duct is further fluidly connected to vacuum generating means, so as to provide the second chambers of the first and second housings with an air pressure lower than the air pressure in the first chamber, thus generating the air pressure difference between the first chamber and the second chamber in each of the first and second housings; and wherein the seed output ducts of each of the first and second housings are fluidly connected to the corresponding first chamber of said first and second housings, and the seed reservoirs of the first and second housings are located within the first chamber of said first and second housings.

9. The dual seed metering device according to claim 8, wherein the at least one air duct consists of a first duct fluidly connected to the second chamber of the first housing, and a second duct fluidly connected to the second chamber of the second housing.

10. The dual seed metering device according to claim 8, wherein the at least one air duct consists of a single air duct, fluidly connected to the second chamber of only one of the first and second housings.

11. The dual seed metering device according to claim 8, wherein the at least one air duct consists of a single air duct, fluidly connected to the hollow shaft of the electric motor.

12. The dual seed metering device according to claim 8, wherein the air pressure in the first chambers of the first and second housings is approximately the atmospheric pressure.

13. The dual seed metering device according to claim 1, wherein the clutches that connect the hollow shaft of the electric motor to the corresponding seed metering discs of the first and second housings are unidirectional mechanical clutches, arranged in opposite orientation, such that in one direction of rotation of the shaft one clutch will not transmit power from the electric motor to its corresponding seed metering disc and in an opposite direction of rotation of the shaft the other clutch will not transmit power from the electric motor to its corresponding seed metering disc.

14. The dual seed metering device according to claim 1, wherein the clutches that connect the hollow shaft of the electric motor to the corresponding seed metering discs of the first and second housings are electronically controlled magnetic clutches, which can independently disable or allow the transmission of power from the electric motor to each of the seed metering discs.

15. The dual seed metering device according to claim 1, wherein the clutches that connect the hollow shaft of the electric motor to the corresponding seed metering discs of the first and second housings are unidirectional mechanical clutches, arranged in opposite orientation, such that in one direction of rotation of the shaft one of the clutches will not transmit power to the respective seed metering disc and in an opposite direction of rotation of the shaft the other clutch will not transmit power to the respective seed metering disc, and wherein one of the unidirectional mechanical clutches is connected to the respective seed metering disc by means of a planetary or epicyclic gear train, which inverts the direction of rotation of said seed metering disc in relation to the rotation direction of said respective clutch.

16. The dual seed metering device according to claim 1, wherein the releasing means for releasing the seeds from the seed capturing and securing means comprises a wheel made of flexible material, arranged on the side of the seed metering discs opposite the seeds, which locally interrupt the air pressure difference on the seed capturing and retaining means, causing the release of the seeds.

17. The dual seed metering device according to claim 1, wherein each of the seed metering discs comprise singulating means to prevent the simultaneous capture and release of two or more seeds from the seed capturing and retaining means, remove excess of captured seeds and return them to their corresponding reservoir.

18. The dual seed metering device according to claim 17, wherein the singulating means comprise curved plates, which are each arranged on the side of their corresponding seed metering disc in which the seeds are located.

19. The dual seed metering device according to claim 1, wherein each of the seed metering discs comprise auxiliary ejection and cleaning means, which clean and remove obstructions from the seed capturing and retaining means, and eject seeds which were not properly released by the releasing means.

20. The dual seed metering device according to claim 19, wherein the auxiliary ejection and cleaning means comprise a toothed wheel made of flexible material arranged on the side of the discs opposite the seeds.

* * * * *